United States Patent [19]
Kunisada et al.

[11] Patent Number: 6,084,785
[45] Date of Patent: Jul. 4, 2000

[54] ELECTRIC POWER CONVERTER

[75] Inventors: Hideaki Kunisada, Hitachi; Keizo Shimada, Jyuou-machi; Hideyasu Umetsu, Hitachi, all of Japan

[73] Assignee: HItachi, Ltd., Tokyo, Japan

[21] Appl. No.: 09/035,897

[22] Filed: Mar. 6, 1998

[30] Foreign Application Priority Data

Mar. 19, 1997 [JP] Japan ..................... 9-066049

[51] Int. Cl.$^7$ .......................... H02M 5/45; H02M 3/18; H02M 1/12; H02M 7/537
[52] U.S. Cl. .................. 363/37; 363/53; 363/56; 363/127; 363/132; 363/40; 363/44
[58] Field of Search ................... 363/37, 40, 44, 363/53, 56, 55, 127, 132

[56] References Cited

U.S. PATENT DOCUMENTS

| | | | |
|---|---|---|---|
| 4,734,634 | 3/1988 | Kito et al. | 318/778 |
| 4,980,812 | 12/1990 | Johnson, Jr. et al. | 363/44 |
| 5,315,497 | 5/1994 | Severinsky | 363/34 |
| 5,343,079 | 8/1994 | Mohan et al. | 363/44 |

*Primary Examiner*—Peter S. Wong
*Assistant Examiner*—Rajnikant B. Patel
*Attorney, Agent, or Firm*—Antonelli, Terry, Stout & Kraus, LLP

[57] ABSTRACT

An electric power converter having an AC input and AC output, and comprising a power rectifier and a power inverter having a DC three-wire circuit, wherein means for detecting a current or a voltage is connected between the AC power source and ground. When a current or a voltage is detected, an alarm is produced or the apparatus is halted. This makes it possible to judge whether the power inverter is in a state capable of producing an excessively large potential.

11 Claims, 14 Drawing Sheets

ELECTRIC POWER CONVERTER

BACKGROUND OF THE INVENTION

The present invention relates to an electric power converter of a type which has both an AC input and an AC output, and includes a DC three-wire circuit consisting of a positive phase, a neutral phase and a negative phase in a portion of the circuit, and which further includes a power rectifier and a power inverter sharing an AC wire and a DC neutral phase.

In an electric power converter for converting an AC input into a DC output or for converting a DC input into an AC output sharing an AC input wire, a DC neutral phase and an AC output wire, as disclosed in Japanese Patent Laid-Open No. 15171/1993, a power rectifier and a power inverter are connected in a half-bridge configuration, so that a current of an AC phase connected to a DC neutral phase flows into a capacitor or flows out of the capacitor in the DC circuit. This electric power converter can be constructed so as to have a small size, as compared to one in which the power rectifier and the power inverter are connected in a full-bridge configuration, and has been put into practical use in the small-capacity electric power converters.

Problems inherent in the prior art will now be described with reference to FIGS. 11 to 18.

FIG. 11 illustrates an electric power converter of a single-phase AC input type in which power is input from a single-phase AC power source connection unit 1 and power is output the power to a load connection unit 32 through a power rectifier, a three-wire DC circuit consisting of a positive phase, a neutral phase and a negative phase, and a power inverter. The power rectifier is constituted by a single-phase AC power source connection unit 1, transistors 7 and 8 connected in series between the positive phase and the negative phase of the DC circuit, diodes 11 and 12 connected in inverse parallel arrangement with the transistors 7 and 8, a reactor 5 connected between the neutral points of the transistors 7, 8 and a first phase of the single-phase AC power source connection unit 1, capacitors 15 and 16 connected in series between the positive phase and the negative phase with their neutral point being connected to the second phase of the single-phase AC power source connection unit 1 and to the neutral phase of the DC circuit, and a capacitor 3 connected in parallel with the single-phase AC power source connection unit 1. That is, a power rectifier working as an electric power converter is constituted as a half-bridge type converter circuit (often called a half-bridge type single-phase power rectifier) to convert a single-phase alternating current into a direct-current three-wire output.

The power inverter is constituted by transistors 17 and 18 connected in series between the positive phase and the negative phase of the DC circuit, diodes 21 and 22 connected in inverse parallel relationship with the transistors 17 and 18, a reactor 25 connected between the neutral point of the transistors 17, 18 and a first phase of the load connection unit 32, two capacitors 15 and 16 connected in series between the positive phase and the negative phase of the DC circuit with their neutral point being connected to the second phase of the single-phase AC power source connection unit 1 and to the neutral phase of the DC circuit, and a capacitor 27 connected in parallel with the load connection unit 32.

To form a noise filter for the load connection unit 32, a capacitor 29 is connected between ground and the first phase of the load connection unit 32, and a capacitor 30 is connected between ground and the second phase of the load connection unit 32.

Upon turning the transistors 7, 8, 17 and 18 on and off, the AC input current ideally assumes a sinusoidal waveform, and the AC output voltage assumes a sinusoidal waveform, too.

In the following description, the single-phase AC power source connection unit 1 is referred to as single-phase AC power source 1, and the load connection unit 32 is referred to as load device 32.

Here, a potential of the first phase of the load device 32 will be described with reference to FIGS. 12 to 14.

FIG. 12 is a vector diagram of a case where the second phase of the single-phase AC power source 1 is grounded, and the output voltage Vuvo of the power inverter is in phase with the input voltage Vuvi of the single-phase AC power source 1. The second phase that is grounded assumes ground potential, and the output voltage Vuvo of the power inverter is in phase with the input voltage Vuvi of the single-phase AC power source 1. Accordingly, the maximum potential of the first phase of the load device 32 becomes equal to the maximum potential of the input voltage of the single-phase AC power source 1.

FIG. 13 is a vector diagram of a case where the second phase of the single-phase AC power source 1 is grounded, and the output voltage Vuvo of the power inverter is in a reverse phase with respect to the input voltage Vuvi of the single-phase AC power source 1. The second phase that is grounded assumes ground potential, and the output voltage Vuvo of the power inverter is in a reverse phase with respect to the input voltage Vuvi of the single-phase AC power source 1. Here, however, the maximum potential of the first phase of the load device 32 is equal to the maximum potential of the input voltage of the single-phase AC power source 1.

FIG. 14 is a vector diagram of a case where the first phase of the single-phase AC power source 1 is grounded, and the output voltage Vuvo of the power inverter is in a reverse phase with respect to the input voltage Vuvi of the single-phase AC power source 1. The first phase that is grounded assumes ground potential, and the output voltage Vuvo of the power inverter is in a reverse phase with respect to the input voltage Vuvi of the single-phase AC power source 1. Therefore, the maximum potential of the first phase of the load device 32 becomes twice as great as the maximum potential of the input voltage of the single-phase AC power source 1.

The potential of the first phase of the load device 32 is applied to the capacitor 29. When the input voltage to the load device 32 is 100 V, the voltage applied to the capacitor 29 is 100 V in FIGS. 12 and 13, but is 200 V in FIG. 14. Thus, an excess voltage is applied to the capacitor 29 in the case of FIG. 14, i.e., the capacitor is often damaged. An arrester may be connected instead of the capacitor. In this case, too, however, the arrestor may often be damaged.

FIG. 15 illustrates an electric power converter of the three-phase AC input type which inputs power from a three-phase AC power source 2 and outputs power to a load device 33 through a power rectifier, a three-wire DC circuit consisting of a positive phase, a neutral phase and a negative phase, and a power inverter. The power rectifier is constituted by the three-phase AC power source connection unit 2, transistors 7 and 8 connected in series between the positive phase and the negative phase of the DC circuit, diodes 11 and 12 connected in inverse parallel relationship with the transistors 7 and 8, a reactor 5 connected between a neutral point of the transistors 7, 8 and the first phase of the three-phase AC power source 2, transistors 9 and 10 connected in series between the positive phase and the negative phase of the DC circuit, diodes 13 and 14 connected in inverse parallel relationship with the transistors 9 and 10, a reactor 6 connected between a neutral point of the transistors 9, 10 and the third phase of the three-phase AC power source 2, two capacitors 15 and 16 connected in series between the positive phase and the negative phase with their neutral point being connected to the second phase of the three-phase AC power source 2 and to the neutral phase of the DC circuit, a capacitor 3 connected in parallel between the first phase and the second phase of the three-phase AC power source 2, and a capacitor 4 connected in parallel between the second phase and the third phase. That is, a power rectifier working as a power converter is constituted having two half-bridge type converter circuits to convert a three-phase alternating current into a DC three-wire output.

The power inverter is constituted by transistors 17 and 18 connected in series between the positive phase and the negative phase of the DC circuit, diodes 21 and 22 connected in inverse parallel with the transistors 17 and 18, a reactor 25 connected between a neutral point of the transistors 17, 18 and the first phase of the load device 33, transistors 19 and 20 connected in series between the positive phase and the negative phase of the DC circuit, diodes 23 and 24 connected in inverse parallel relationship with the transistors 19 and 20, a reactor 26 connected between a neutral point of the transistors 19, 20 and the third phase of the load device 33, two capacitors 15 and 16 connected in series between the positive phase and the negative phase of the DC circuit with their neutral point being connected to the second phase of the three-phase AC power source 2 and to the neutral phase of the DC circuit, a capacitor 27 connected in parallel between the first phase and the second phase of the load connection unit 33, and a capacitor 28 connected in parallel between the second phase and the third phase.

To form a noise filter for the load device 33, a capacitor 29 is connected between ground and the first phase of the load device 33, a capacitor 30 is connected between ground and the second phase of the load device 33, and a capacitor 31 is connected between ground and the third phase of the load device 33.

Here, the potential of the first phase of the load device 33 will be described with reference to FIGS. 16 to 18.

FIG. 16 is a vector diagram of a case where the second phase of the three-phase AC power source 2 is grounded, and the output voltages Vuvo, Vvwo and Vwuo of the power inverter are in phase with the input voltages Vuvi, Vvwi and Vwui of the three-phase AC power source 2. The second phase that is grounded assumes ground potential, and the output voltage of the power inverter is in phase with the input voltage of the three-phase AC power source 2. Therefore, the maximum potential of the first phase of the load device 33 becomes equal to the maximum potential of the input voltage of the three-phase AC power source 2.

FIG. 17 is a vector diagram of a case where the second phase of the three-phase AC power source 2 is grounded, and the output voltages Vuvo, Vvwo and Vwuo of the power inverter are in a reverse phase with respect to the input voltages Vuvi, Vvwi and Vwui of the three-phase AC power source 2. The second phase that is grounded assumes ground potential, and the output voltage of the power inverter is in a reverse phase with respect to the input voltage of the three-phase AC power source 2. Therefore, the maximum potential of the first phase of the load device 33 becomes equal to the maximum potential of the input voltage of the three-phase AC power source 2.

FIG. 18 is a vector diagram of a case where the first phase of the three-phase AC power source 2 is grounded, and the output voltages Vuvo, Vvwo and Vwuo of the power inverter are in a reverse phase with respect to the input voltages Vuvi, Vvwi and Vwui of the three-phase AC power source 2. The first phase that is grounded assumes ground potential, and the output voltage of the power inverter is in reverse phase with the input voltage of the three-phase AC power source 2. Therefore, the maximum potential of the first phase of the load device 33 becomes twice as great as the maximum potential of the input voltage of the three-phase AC power source 2.

The potential of the first phase of the load device 33 is applied to the capacitor 29. When the input voltage to the load device 33 is 200 V, the voltage applied to the capacitor 29 is 200 V in FIGS. 16 and 17, but is 400 V in FIG. 18. Thus, an excess voltage is applied to the capacitor 29 in the case of FIG. 18, i.e., the capacitor is often damaged. An arrester may be connected instead of the capacitor. In this case, too, however, the arrestor may often be damaged.

The half-bridge type power converter sharing an AC wire and a neutral phase of the DC circuit can be realized in a small size, but the potential of the load device varies depending upon which phase of the AC power source is grounded, subjecting the capacitor or the arrester connected between the load device and ground to damage, as described above. So far, this problem has been coped with by confirming the grounded phase at the time of installing the power converter, however, this involves an inconvenience in that the grounded phase must be confirmed every time the input power source is renewed. Therefore, proper ground detection and protection have been desired from the standpoint of maintaining the reliability of the system.

SUMMARY OF THE INVENTION

The feature of the present invention resides in an electric power converter having an AC input and an AC output, including, in a portion of the circuit, a DC three-wire circuit of a positive phase, a neutral phase and a negative phase, having capacitors connected between the positive phase and the neutral phase and between the neutral phase and the negative phase, and including a power rectifier and a power inverter sharing an AC wire and the neutral phase of the DC circuit, wherein a current or a voltage across the AC input power source and ground is detected in order to detect the grounding condition.

DESCRIPTION OF THE PREFERRED EMBODIMENTS

Embodiments of the present invention will now be described with reference to the drawings.

Figure 1:
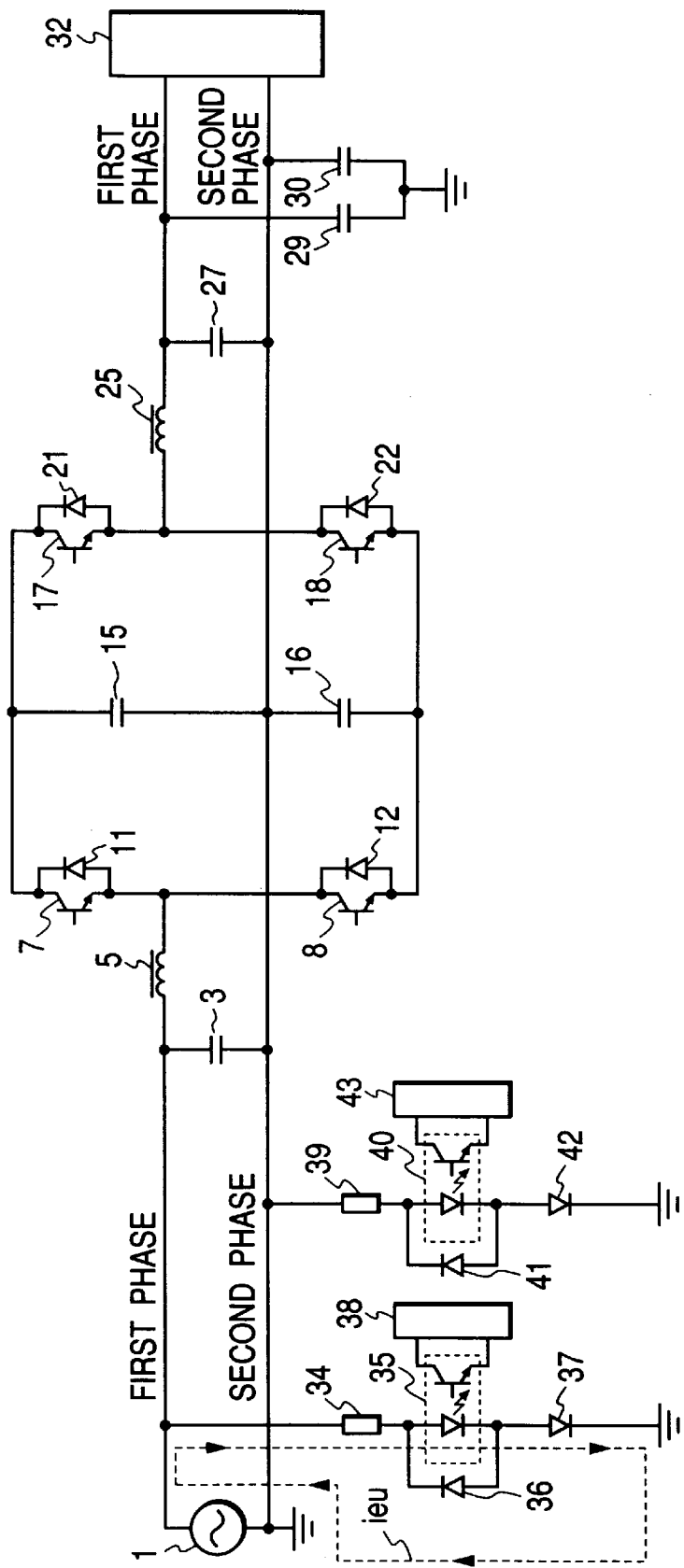
FIG. 1 is a circuit diagram of a first embodiment in which the present invention is applied to a power converter having a single-phase AC input and a single-phase AC output.

FIG. 1 is a circuit diagram illustrating a single-phase power converter according to a first embodiment of the present invention.

Figure 11:
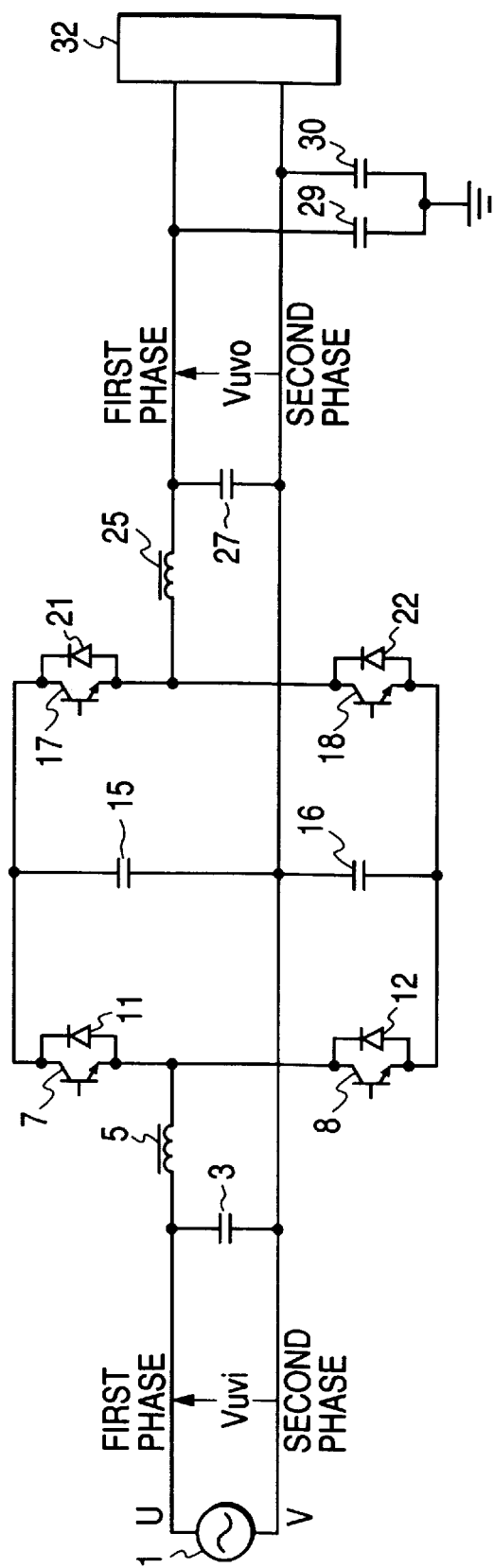
FIG. 11 is a circuit diagram of a half-bridge type power converter having a single-phase AC input and a single-phase AC output.
Figure 12:
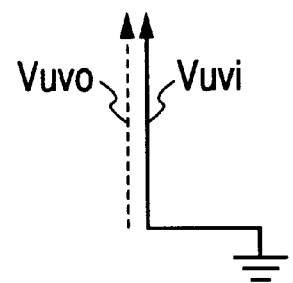
FIG. 12 is a vector diagram of an AC input voltage and an AC output voltage when the second phase of the AC input of the power converter is grounded and the power inverter is in phase with the AC input.
Figure 13:
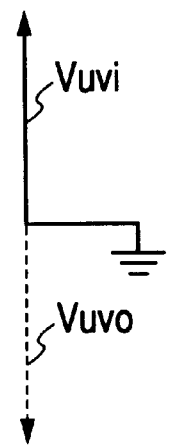
FIG. 13 is a vector diagram of an AC input voltage and an AC output voltage when the second phase of the AC input of the power converter is grounded and the power inverter is in a reverse phase with respect to the AC input.
Figure 14:
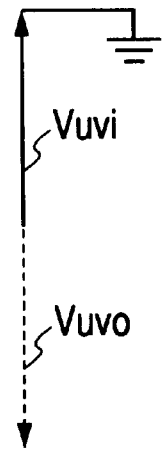
FIG. 14 is a vector diagram of an AC input voltage and an AC output voltage when the first phase of the AC input of the power converter is grounded and the power inverter is in a reverse phase with respect to the AC input.

The constitution of the principal circuit is the same as that of FIG. 11, and so the details thereof will not be described here again. A resistor 34, a photo-coupler 35 and a diode 37 are connected in series between the first phase of the single-phase AC power source 1 and ground.

A diode 36 is connected in inverse parallel arrangement with a light-emitting diode of the photo-coupler 35, and the output of a light-receiving transistor thereof is connected to a ground-judging circuit 38. A resistor 39, a photo-coupler 40 and a diode 42 are connected in series between the second phase of the single-phase AC power source and ground. A diode 41 is connected in inverse parallel relationship with a light-emitting diode of the photo-coupler 40, and the output of a light-receiving transistor thereof is connected to a ground-judging circuit 43.

The manner of detecting the grounding will now be described with reference to FIGS. 1 and 2.

FIG. 1 illustrates a case where the second phase of the single-phase AC power source 1 is grounded. A ground detection current ieu flows from the first phase of the single-phase AC power source 1 through a loop consisting of resistor 34, photo-coupler 35, diode 37, ground and the second phase of the single-phase AC power source 1, and the light-receiving transistor in the photo-coupler 35 is turned on. No ground detection current flows into the photo-coupler 40, and the light-receiving transistor in the photo-coupler 40 is turned off.

Figure 2:
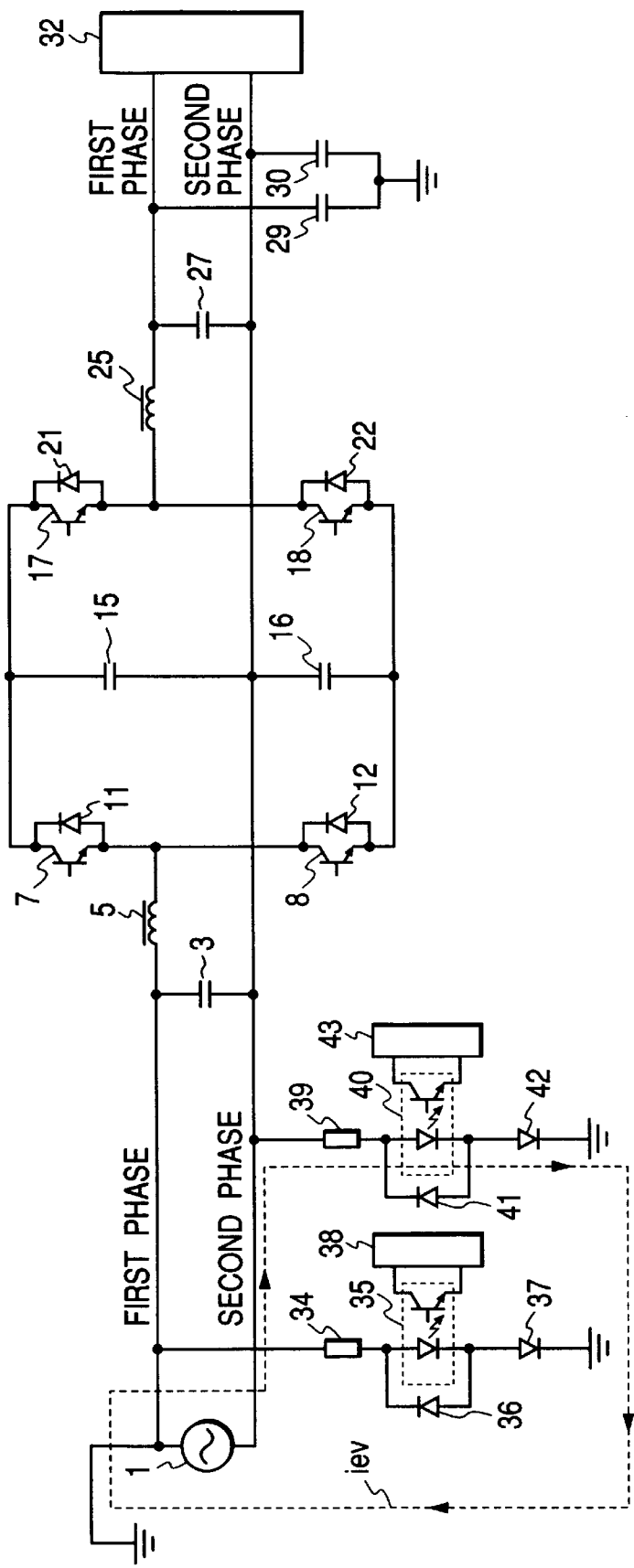
FIG. 2 is a circuit diagram illustrating the operation of the first embodiment.

FIG. 2 illustrates a case where the first phase of the single-phase AC power source 1 is grounded. A ground detection current iev flows from the second phase of the single-phase AC power source 1 through a loop consisting of resistor 39, photo-coupler 40, diode 42, ground and the first phase of the single-phase AC power source 1, and the light-receiving transistor in the photo-coupler 40 is turned on. No ground detection current flows into the photo-coupler 35, and so the light-receiving transistor in the photo-coupler 35 is turned off.

When the single-phase AC power source 1 is not grounded, no ground detection current flows, and the photo-couplers 35 and 40 are both turned off. When the single-phase AC power source 1 is grounded at its second phase or is not grounded, no excess voltage is applied to the capacitor 29. When the first phase is grounded, an excess voltage may often be applied to the capacitor 29. When grounding of the first phase is detected, an alarm is generated by an apparatus in which the power inverter is operating in phase and in synchronism with the AC input power source, such as a power failure-free power source apparatus. By changing the grounding of the input power source, application of an excess voltage can be prevented in advance. In an apparatus in which the power inverter is operating out of synchronism with the AC input power source, the operation of the apparatus is halted, so that an excess voltage will not be applied to the capacitor 29.

By the above-mentioned arrangement, the following relationships are maintained between grounding of the single-phase AC power source 1 and the outputs of the photo-couplers.

|  | Photo-coupler 35 | Photo-coupler 40 |
| --- | --- | --- |
| First phase grounded | off | on |
| Second phase grounded | on | off |
| Not grounded | off | off |

As described above, this embodiment makes it possible to discriminate in which one of the grounding states, i.e., first phase is grounded, second phase is grounded or no grounding, the single-phase power converter is placed.

Figure 3:
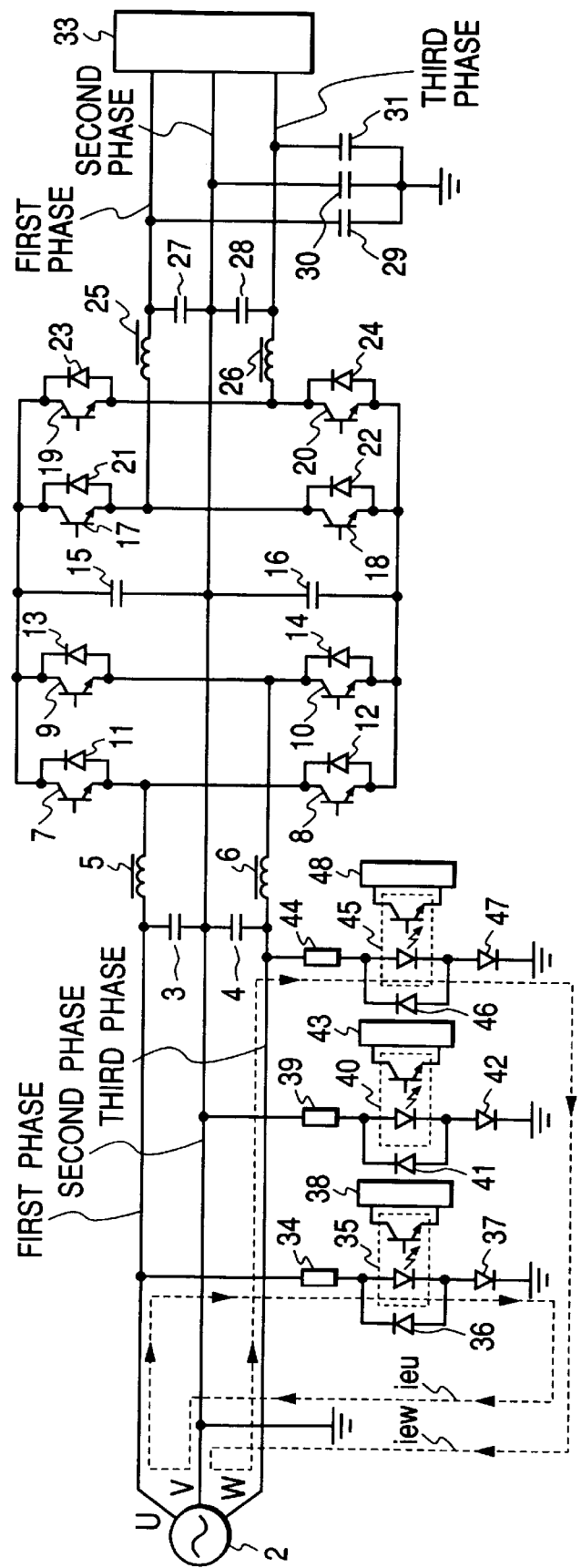
FIG. 3 is a circuit diagram of a second embodiment in which the present invention is applied to a power converter having a three-phase AC input and a three-phase AC output.

FIG. 3 is a circuit diagram illustrating a three-phase power converter according to a second embodiment of the present invention.

Figure 15:
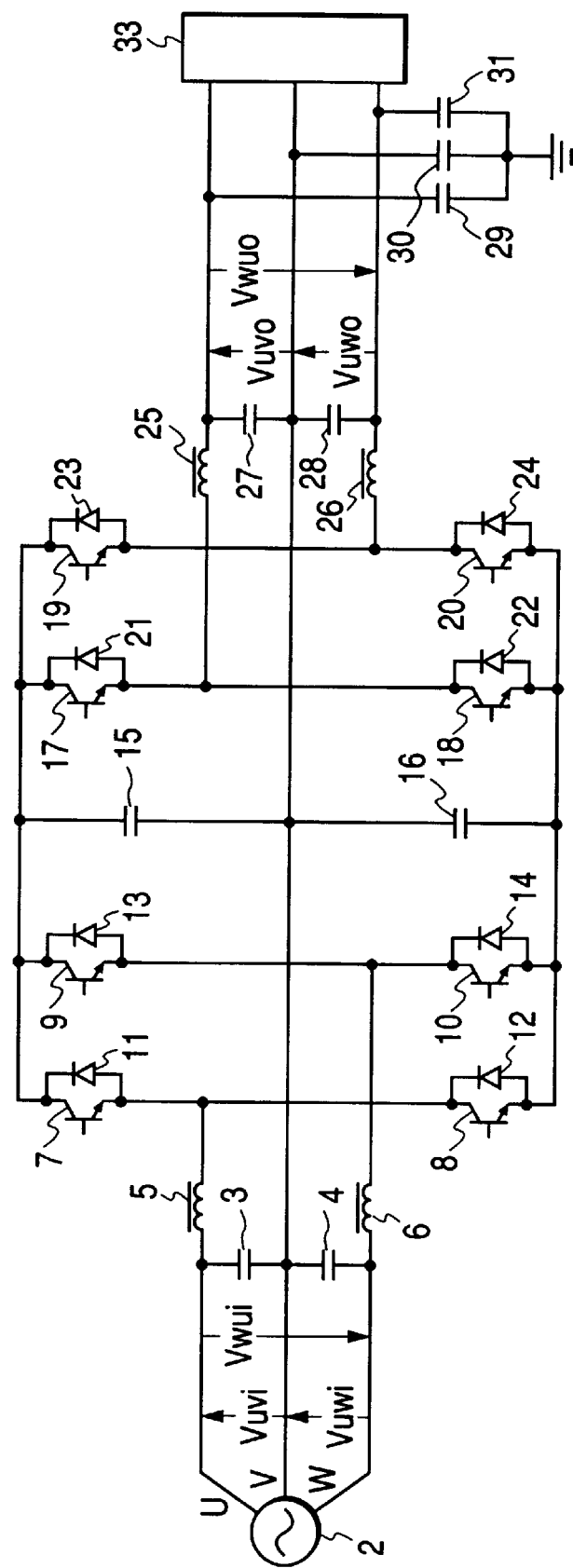
FIG. 15 is a circuit diagram of a half-bridge type power converter of having a three-phase AC input and a three-phase AC output.
Figure 16:
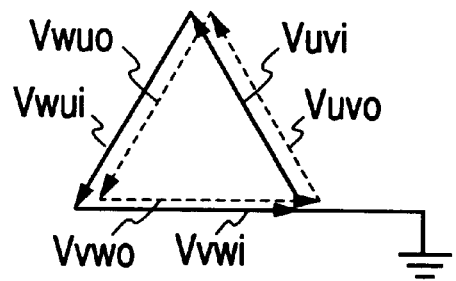
FIG. 16 is a vector diagram of an AC input voltage and an AC output voltage when the second phase of the AC input of the power converter is grounded and the power inverter is in phase with the AC input.
Figure 17:
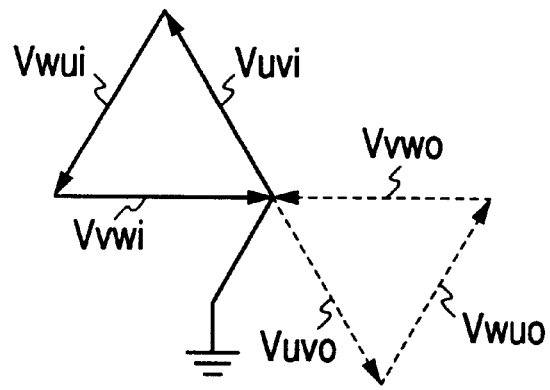
FIG. 17 is a vector diagram of an AC input voltage and an AC output voltage when the second phase of the AC input of the power converter is grounded and the power inverter is in a reverse phase with respect to the AC input.
Figure 18:
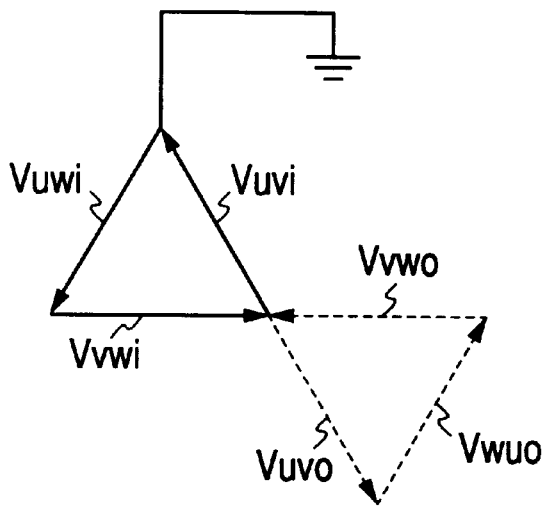
FIG. 18 is a vector diagram of an AC input voltage and an AC output voltage when the first phase of the AC input of the power converter is grounded and the power inverter is in a reverse phase with respect to the AC input.

The constitution of the main circuit is the same as that of FIG. 15. A resistor 34, a photo-coupler 35 and a diode 37 are connected in series between the first phase of the three-phase AC power source and ground. A diode 36 is connected in inverse parallel relationship with a light-emitting diode in the photo-coupler 35, and the output of a light-receiving transistor thereof is connected to a ground-judging circuit 38. A resistor 39, a photo-coupler 40 and a diode 42 are connected in series between the second phase of the three-phase AC power source and ground. A diode 41 is connected in inverse parallel relationship with a light-emitting diode in the photo-coupler 40 and the output of a light-receiving transistor thereof is connected to a ground-judging circuit 43. A resistor 44, a photo-coupler 45 and a diode 47 are connected in series between the third phase of the three-phase AC power source and ground. A diode 46 is connected in inverse parallel relationship with a light-emitting diode in the photo-coupler 45, and the output of a light-receiving transistor thereof is connected to a ground-judging circuit 48. FIG. 3 can be applied without any change to a single-phase three-wire type power converter.

The manner of detecting the grounding will be described with reference to FIGS. 3 and 4.

FIG. 3 illustrates a case where the second phase of the three-phase AC power source 2 is grounded. A ground detection current ieu flows from the first phase of the three-phase AC power source 2 through a loop consisting of resistor 34, photo-coupler 35, diode 37, ground and the second phase of the three-phase AC power source 2, and a light-receiving transistor in the photo-coupler 35 is turned on. A ground detection current iew flows from the third phase of the three-phase AC power source 2 through a loop consisting of resistor 44, photo-coupler 45, diode 47, ground and the second phase of the three-phase AC power source 2, and a light-receiving transistor in the photo-coupler 45 is turned on. No ground detection current flows into the photo-coupler 40, and so the light-receiving transistor in the photo-coupler 40 is turned off.

Figure 4:
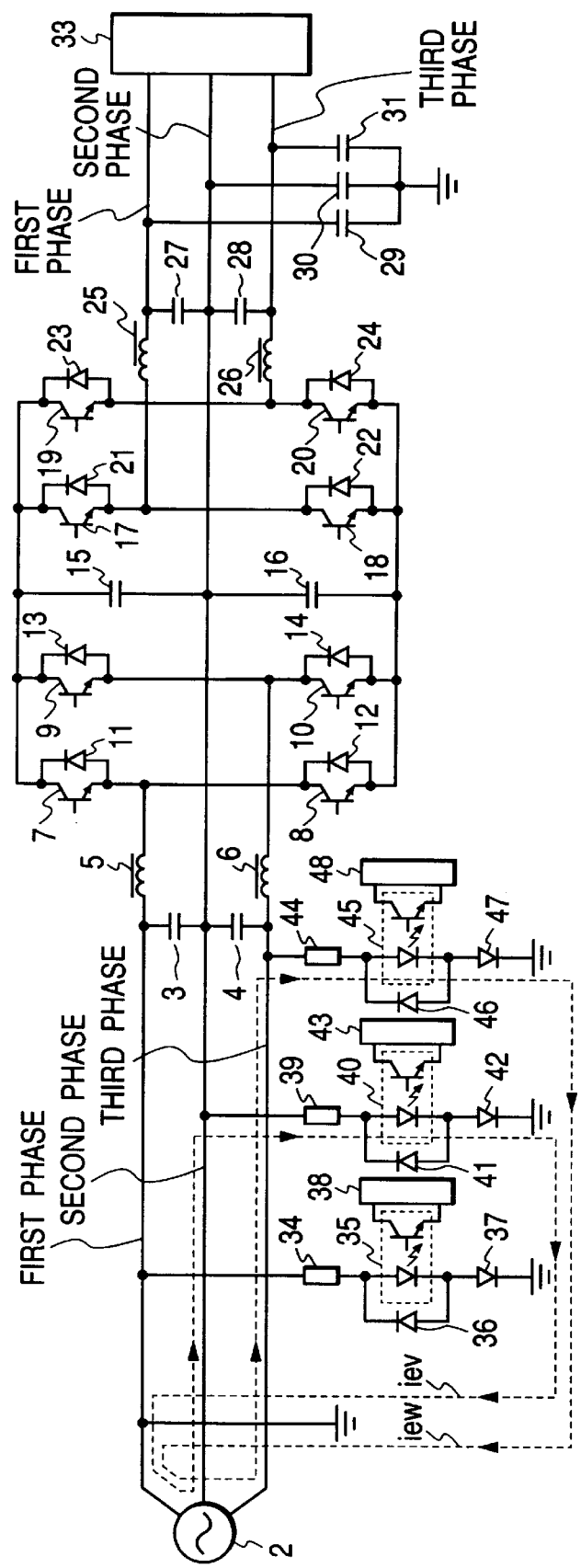
FIG. 4 is a circuit diagram illustrating the operation of the second embodiment.

FIG. 4 illustrates a case where the first phase of the three-phase AC power source 2 is grounded. A ground detection current iev flows from the second phase of the three-phase AC power source 2 through a loop of consisting resistor 39, photo-coupler 40, diode 42, ground and the first phase of the three-phase AC power source 2, and a light-receiving transistor in the photo-coupler 40 is turned on. A ground detection current iew flows from the third phase of the three-phase AC power source 2 through a loop consisting of resistor 44, photo-coupler 45, diode 47, ground and the first phase of the three-phase AC power source 2, and a light-receiving transistor in the photo-coupler 45 is turned on. No ground detection current flows into the photo-coupler 35, and the light-receiving transistor in the photo-coupler 35 is turned off. When the three-phase AC power source 2 is not grounded, no ground detection current flows, and the photo-couplers 35, 40 and 45 are all turned off. When the neutral point of the three-phase AC power source 2 is grounded, the ground detection current flows into all of the photo-couplers; i.e., the photo-couplers 35, 40 and 45 are all turned on.

When the three-phase AC power source 2 is grounded at its second phase or is not grounded, no excess voltage is applied to the capacitors 29 and 31. When the first phase is grounded, the third phase is grounded and the neutral point is grounded, an excess voltage may be applied to the capacitors 29 and 31. Upon detecting the grounding of the first phase, grounding of the third phase and grounding of the neutral point, therefore, an alarm is produced or the apparatus is halted and is protected in the same manner as in the first embodiment.

By the above-mentioned matters arrangement, the following relationships are maintained between grounding of the three-phase AC power source 2 and the outputs of the photo-couplers.

| | Photo-coupler 35 | Photo-coupler 40 | Photo-coupler 45 |
|---|---|---|---|
| First phase grounded | off | on | on |
| Second phase grounded | on | off | on |
| Third phase grounded | on | on | off |
| Neutral point grounded | on | on | on |
| Not grounded | off | off | off |

As described above, this embodiment makes it possible to discriminate in which one of the states, i.e., first phase is grounded, second phase is grounded, third phase is grounded, neutral point is grounded or no grounding, the three-phase power converter is placed.

Figure 5:
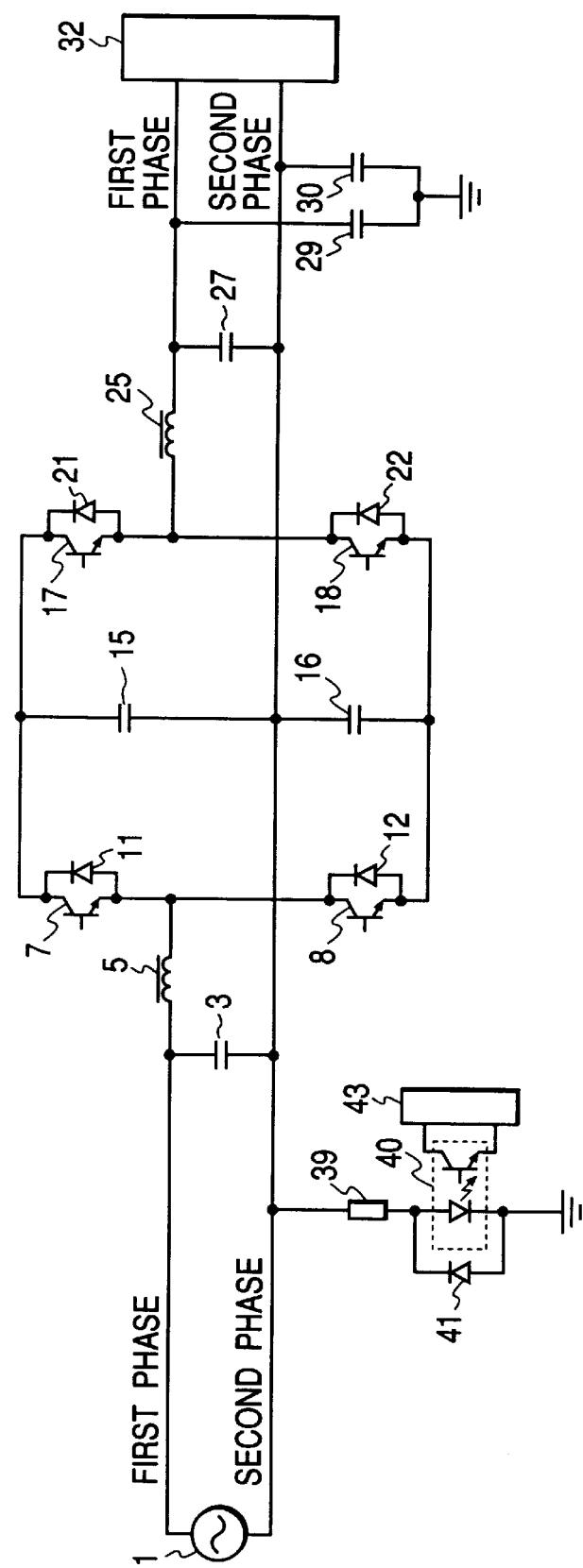
FIG. 5 is a circuit diagram of a third embodiment in which the present invention is applied to a power converter having a single-phase AC input and a single-phase AC output.

FIG. 5 is a circuit diagram illustrating a single-phase power converter according to a third embodiment of the present invention.

The constitution of the main circuit is the same as that of FIG. 11. A resistor 39 and a photo-coupler 40 are connected between ground and the second phase of the single-phase AC power source which is connected to the neutral phase of the DC circuit. A diode 41 is connected in inverse parallel relationship with a light-emitting diode of the photo-coupler 40, and the output of a light-receiving transistor thereof is connected to a ground-judging circuit 43.

When the second phase of the single-phase AC power source 1 is grounded, no ground detection current flows into the photo-coupler 40, and the light-receiving transistor of the photo-coupler 40 is turned off. When the first phase of the single-phase AC power source 1 is grounded, a ground detection current flows from the second phase of the single-phase AC power source 1 through a loop consisting of resistor 39, photo-coupler 40, ground and the first phase of the single-phase AC power source 1, and the light-receiving transistor in the photo-coupler 40 is turned on. When the single-phase AC power source 1 is not grounded, no ground detection current flows, and the photo-coupler 40 is turned off. By the above-mentioned arrangement, the following relationships are maintained between grounding of the single-phase AC power source 1 and the outputs of the photo-coupler.

| | Photo-coupler 40 |
|---|---|
| First phase grounded | on |
| Second phase grounded | off |
| Not grounded | off |

When the single-phase AC power source 1 is grounded at the second phase or is not grounded, no excess voltage is applied to the capacitor 29. When the first phase is grounded and the photo-coupler 40 is turned on, therefore, an alarm is produced or the apparatus is halted to prevent the application of an excess voltage in advance. As described above, the ground current is detected by connecting the ground current-detecting circuit to the second phase of the single-phase AC power source that is connected to the neutral phase of the DC circuit, making it possible to discriminate whether the apparatus is in a grounded state in which an excess voltage could be applied to the capacitor 29.

Figure 6:
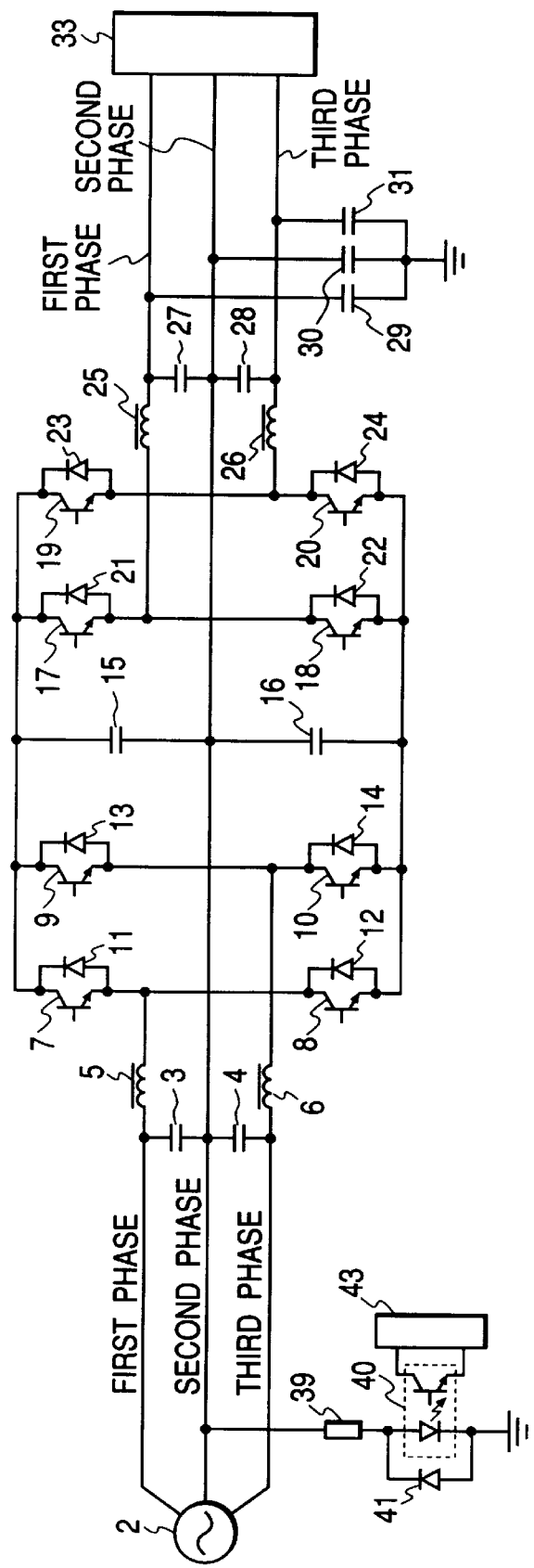
FIG. 6 is a circuit diagram of a fourth embodiment in which the present invention is applied to a power converter having a three-phase AC input and a three-phase AC output.

FIG. 6 is a circuit diagram illustrating a three-phase power converter according to a fourth embodiment of the present invention.

The constitution of the main circuit is the same as that of FIG. 15. A resistor 39 and a photo-coupler 40 are connected in series between ground and the second phase of the three-phase AC power source connected to the neutral phase of the DC circuit. A diode 41 is connected in inverse parallel relationship with a light-emitting diode in the photo-coupler 40, and the output of the light-receiving transistor thereof is connected to a ground-judging circuit 43.

When the second phase of the three-phase AC power source 2 is grounded, no ground detection current flows into the photo-coupler 40, and a light-receiving transistor in the photo-coupler 40 is turned off. When the first phase of the three-phase AC power source 2 is grounded, a ground detection current flows from the second phase of the three-phase AC power source 2 through a loop consisting of resistor 39, photo-coupler 40, ground and the first phase of the three-phase AC power source 2, and the light-receiving transistor of the photo-coupler 40 is turned on. When the three-phase AC power source 2 is not grounded, no ground detection current flows, and the photo-coupler 40 is turned off. When the three-phase AC power source 2 is grounded at its neutral point, a ground detection current flows and the photo-coupler 40 is turned on.

By the above-mentioned matters arrangement, the following relationships are maintained between grounding of the three-phase AC power source 2 and the outputs of the photo-coupler.

| | Photo-coupler 40 |
|---|---|
| First phase grounded | on |
| Second phase grounded | off |
| Third phase grounded | on |
| Neutral point grounded | on |
| Not grounded | off |

When the three-phase AC power source 1 is grounded at the second phase or is not grounded, no excess voltage is applied to the capacitors 29 and 31. When the first phase is grounded, the third phase is grounded or the neutral point is grounded and the photo-coupler 40 is turned on, therefore, an alarm is produced or the apparatus is halted to prevent the application of an excess voltage in advance. As described above, the ground current is detected by connecting the ground current-detecting circuit to the second phase of the three-phase AC power source that is connected to the neutral phase of the DC circuit, making it possible to discriminate whether the apparatus is in a grounded state in which an excess voltage could be applied to the capacitors 29 and 31.

In the third and fourth embodiments of the present invention, the grounding is detected for only the phase of the AC power source that is connected to the neutral phase of the DC circuit, requiring a decreased number of parts and featuring excellent reliability and economy. It is further possible to increase the value of ground current detection by connecting a Zener diode in series with the photo-coupler.

An embodiment for detecting the ground current using means other than a photo-coupler now will be described.

Figure 7:
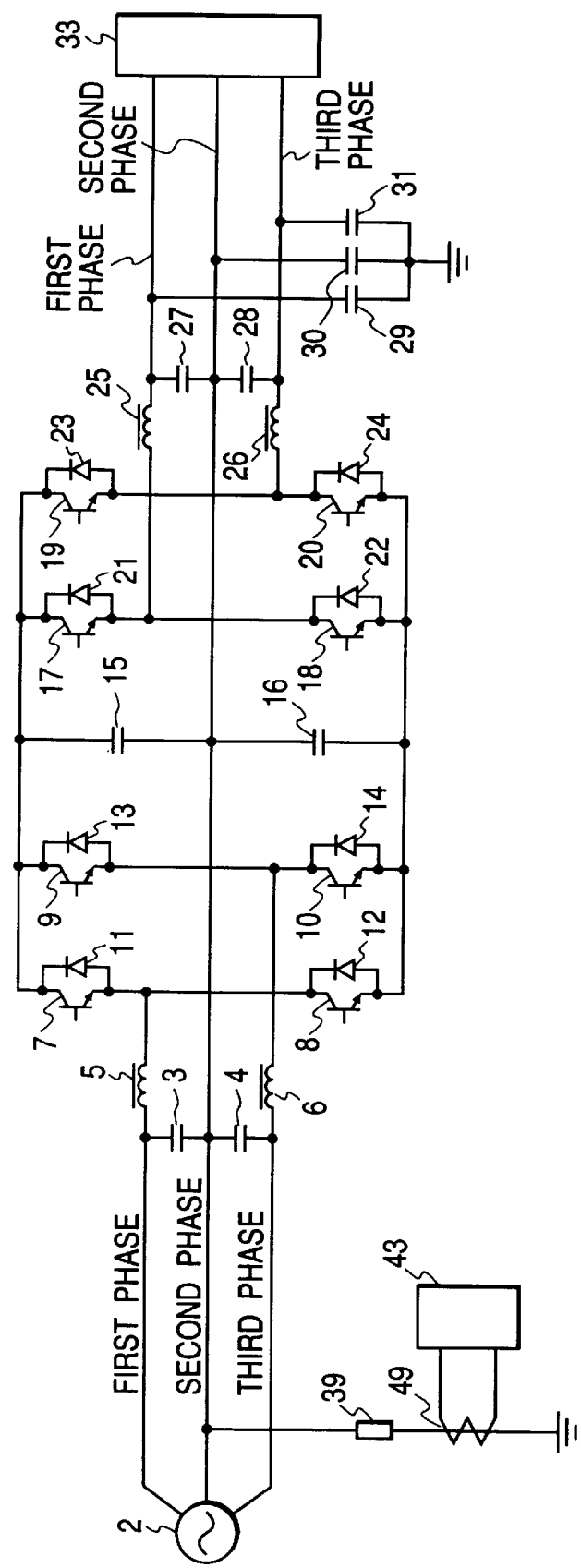
FIG. 7 is a circuit diagram of a fifth embodiment in which the present invention is applied to a power converter having a three-phase AC input and a three-phase AC output.

FIG. 7 is a circuit diagram illustrating a three-phase power converter according to a fifth embodiment of the present invention.

The constitution of the principal circuit is the same as that of FIG. 15. A resistor 39 and a current transformer 49 are connected in series between ground and the second phase of the three-phase AC power source connected to the neutral phase of the DC circuit, and the output of the current transformer 49 is connected to a ground-judging circuit 43.

When the second phase of the three-phase AC power source 2 is grounded, no ground detection current flows into the current transformer 49, and no current is outputted from the current transformer 49. When the first phase of the three-phase AC power source 2 is grounded, a ground detection current flows from the second phase of the three-phase AC power source 2 through a loop consisting of resistor 39, current transformer 49, ground and the first phase of the three-phase AC power source 2, and a current is outputted from the current transformer 49. When the three-phase AC power source 2 is not grounded, no ground detection current flows, and no current is outputted from the current transformer 49. When the three-phase AC power source 2 is grounded at its neutral point, furthermore, a ground detection current flows and a current is outputted from the current transformer 49. The ground-judging circuit 43 detects an output current of the current transformer 49. When no current is flowing, it can be determined that the second phase is grounded or the AC power source is not grounded. When the current flows, it can be determined that the first phase is grounded, the third phase is grounded or the neutral point is grounded. Like the fourth embodiment, therefore, an alarm is produced or the apparatus is halted to prevent the application of an excess voltage in advance. As described above, the same action and effect as those of the embodiment of FIG. 6 can be obtained even when the ground current is detected by using a current transformer, instead of the photo-coupler used in the embodiment of FIG. 6.

Figure 8:
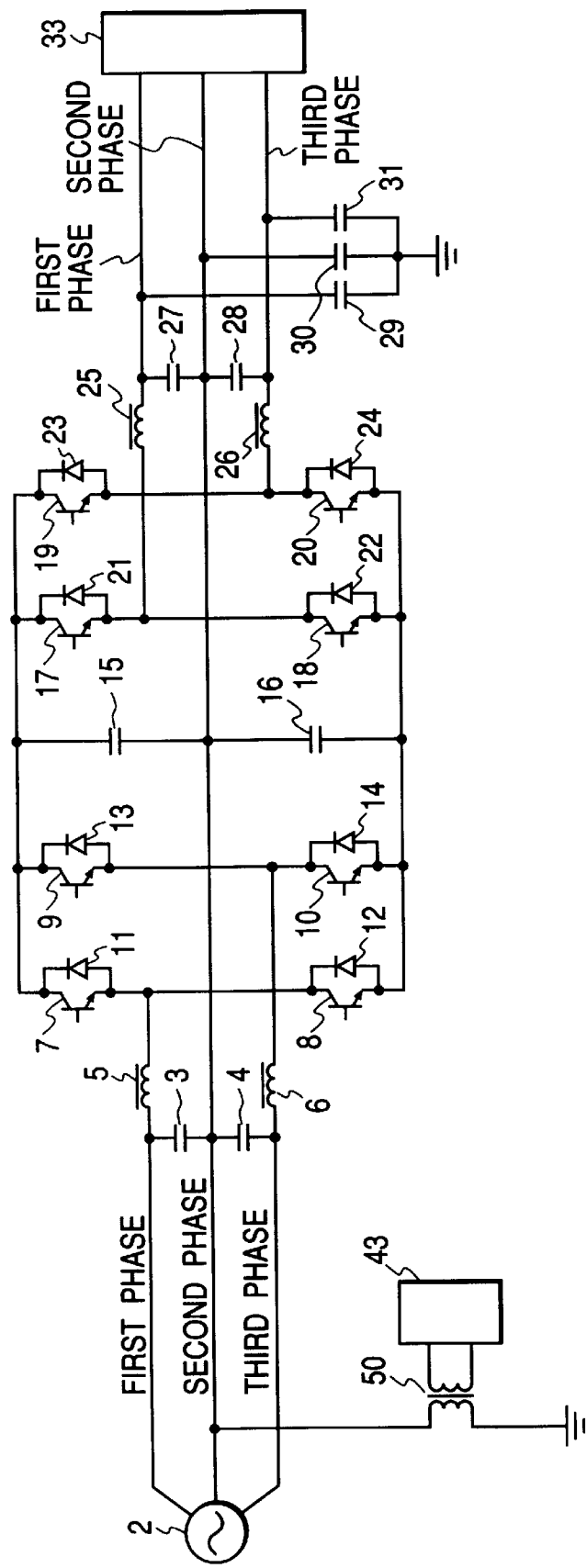
FIG. 8 is a circuit diagram of a sixth embodiment in which the present invention is applied to a power converter having a three-phase AC input and a three-phase AC output.

FIG. 8 is a circuit diagram illustrating a three-phase power converter according to a sixth embodiment of the present invention.

The constitution of the principal circuit is the same as that of FIG. 15. A transformer 50 is connected between ground and the second phase of the three-phase AC power source connected to the neutral phase of the DC circuit, and the output of the transformer 50 is connected to the ground-judging circuit 43.

Figure 9:
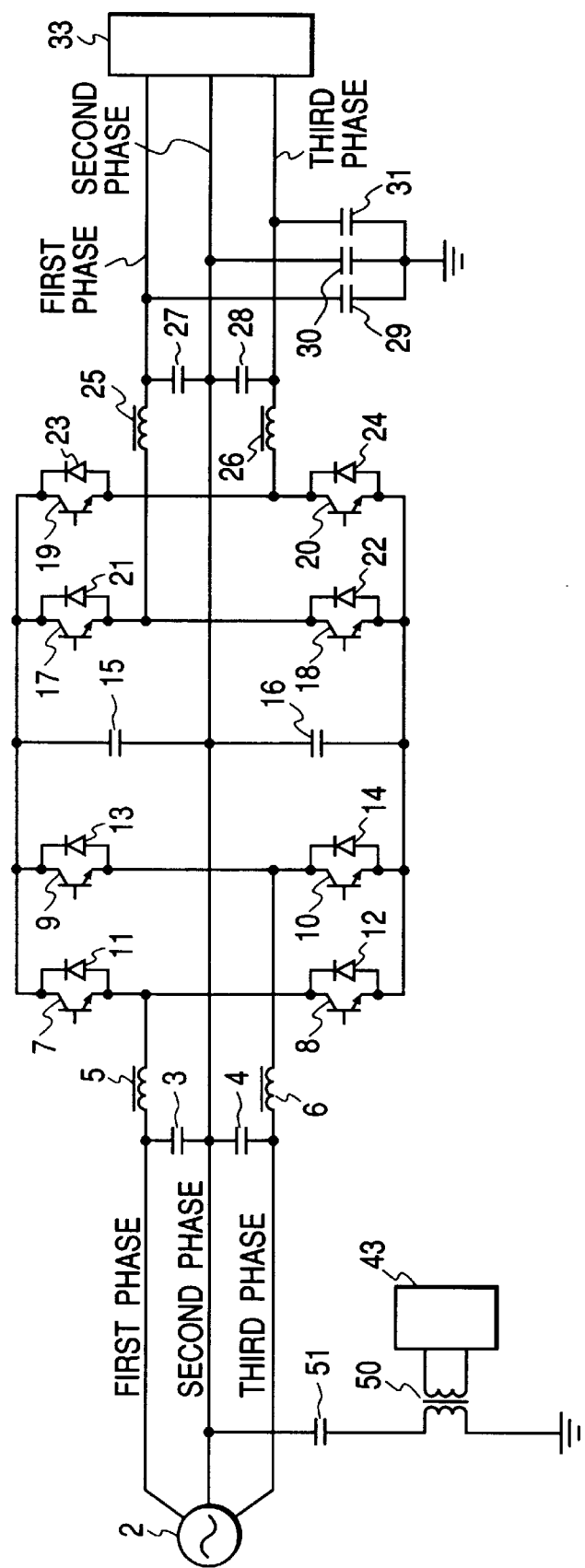
FIG. 9 is a circuit diagram of a seventh embodiment in which the present invention is applied to a power converter having a three-phase AC input and a three-phase AC output.

When the second phase of the three-phase AC power source 2 is grounded, no voltage is applied to the primary side of the transformer 50 and no voltage is outputted from the transformer 50. When the first phase of the three-phase AC power source 2 is grounded, a voltage generates between ground and the second phase of the three-phase AC power source 2. Therefore, a voltage is applied to the primary side of the transformer 50 and a voltage is outputted from the transformer 50. When the three-phase AC power source 2 is not grounded, no voltage is applied to the primary side of the transformer 50 and no voltage is outputted from the transformer 50. When the three-phase AC power source 2 is grounded at its neutral point, a voltage is applied to the primary side of the transformer 50 and a voltage is outputted from the transformer 50. The ground-judging circuit 43 detects the voltage output by the transformer 50. When no voltage is outputted, it can be determined that the second phase is grounded or the AC power source is not grounded. When a voltage is outputted, it can be that the first phase is grounded, the third phase is grounded or the neutral point is grounded. Like the fourth embodiment, therefore, an alarm is produced or the apparatus is halted to prevent the application of an excess voltage in advance FIG. 9 is a circuit diagram illustrating a three-phase power converter according to a seventh embodiment of the present invention.

The constitution of the main circuit is the same as that of FIG. 15. A capacitor 51 and a transformer 50 are connected in series between ground and the second phase of the three-phase AC power source connected to the neutral phase of the DC circuit, and the output of the transformer 50 is connected to a ground-judging circuit 43. The grounding is detected in the same manner as the sixth embodiment. The capacitor 51 represents the difference from the sixth embodiment. When a voltage containing a DC component is generated across the second phase and ground, the voltage containing a DC component is applied to the primary side of the transformer 50 in the sixth embodiment often causing the transformer 50 to be magnetically saturated. According to the seventh embodiment, however, the DC component is applied to the capacitor 51, and the AC voltage, without containing the DC component, is applied to the primary side of the transformer 50. Therefore, the transformer 50 is not magnetically saturated.

Figure 10:
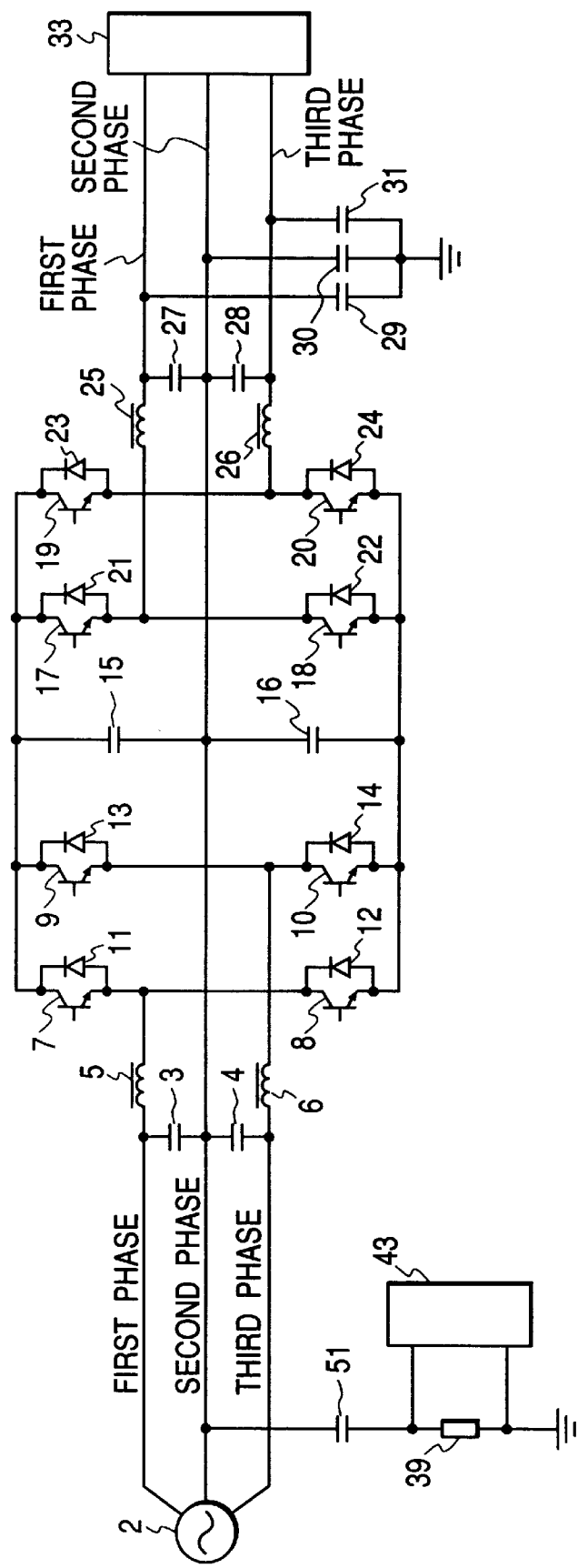
FIG. 10 is a circuit diagram of an eighth embodiment in which the present invention is applied to a power converter having a three-phase AC input and a three-phase AC output.

FIG. 10 is a circuit diagram illustrating a three-phase power converter according to an eighth embodiment of the present invention.

The constitution of the main circuit is the same as that of FIG. 15. A capacitor 51 and a resistor 39 are connected between ground and the second phase of the three-phase AC power source connected to the neutral phase of the DC circuit, and the voltage of the resistor 39 is inputted to a ground-judging circuit 43.

When the second phase of the three-phase AC power source 2 is grounded, no voltage is generated across the resistor 39. When the first phase of the three-phase AC power source 2 is grounded, a voltage is generated between ground and the second phase of the three-phase AC power source 2 and, hence, a voltage generates across the resistor 39. When the three-phase AC power source 2 is not grounded, no voltage is generated across the resistor 39. When the three-phase AC power source 2 is grounded at the neutral point, a voltage is generated across the resistor 39. The ground-judging circuit 43 detects a voltage across the resistor 39. When there is no voltage, it is determined that the second phase is grounded or the AC power source is not grounded. When there is a voltage, it is determined that the first phase is grounded, the third phase is grounded or the neutral point is grounded. Like the fourth embodiment, therefore, an alarm is produced or the apparatus is halted to prevent the application of an excess voltage in advance.

In this embodiment, the resistor is used as a current-limiting element. It is, however, also allowable to use a reactor, a capacitor, a transformer, or a composite thereof, such as a resistor and a capacitor in combination. In particular, the capacitor holds the DC component as described above, offering the advantage that means for detecting a current or a voltage can be constituted by using only those parts that operate on AC components only.

According to the present invention, there is provided an electric power converter having an AC input and an AC output, including, in a portion of the circuit, a DC three-wire circuit including a positive phase, a neutral phase and a negative phase, and including a power rectifier and a power inverter sharing an AC wire and the neutral phase of the DC circuit, wherein the grounded state of the AC input power source is reliably detected to prevent the application of an excess potential of the power inverter in advance.

We claim:

1. An electric power converter having an AC input for connection to an AC input power source and an AC output for connection to a load, and including a DC unit connected to said AC input and said AC output and constituted by three wires, including a positive phase wire, a neutral phase wire and a negative phase wire, having a positive-side capacitor connected between the positive phase wire and the neutral phase wire among the three wires of the DC unit and a negative-side capacitor connected between the neutral phase wire and the negative phase wire among the three wires of the DC unit, and including at least one half-bridge circuit in which an end of a power rectifier is connected to the positive phase wire of the three wires of the DC unit and the other end thereof is connected to the negative phase wire of the three wires of the DC unit and at least one half-bridge circuit in which an end of a power inverter is connected to the positive phase wire of the three wires of the DC unit and the other end thereof is connected to the negative phase wire of the three wires of the DC unit, wherein provision is made of means for detecting the grounding configuration of the AC input power source by detecting a current or a voltage between the AC input power source and ground.

2. An electric power converter according to claim 1, wherein the means for detecting the grounding configuration includes a current-limiting element, a photo-coupler and a diode connected in series between the AC input and ground, as well as a current-limiting element, a photo-coupler and a diode connected in series between ground and the AC input connected to the neutral phase wire of the DC unit, thereby detecting the grounding configuration on the basis of the outputs of the photo-couplers.

3. An electric power converter according to claim 1, wherein the means for detecting the grounding configuration includes a current-limiting element, a photo-coupler and a diode connected in series between ground and the AC input connected to the neutral phase wire of the DC unit, thereby detecting the grounding configuration on the basis of the output of the photo-coupler.

4. An electric power converter according to claim 1, wherein the means for detecting the grounding configuration includes a current-limiting element and a photo-coupler connected in series between ground and the AC input connected to the neutral phase wire of the DC unit, as well as a diode connected in inverse parallel relationship with the photo-coupler, thereby detecting the grounding configuration on the basis of the output of the photo-coupler.

5. An electric power converter according to any one of claims 2 to 4, wherein the means for detecting the grounding configuration includes a Zener diode connected in series with the photo-coupler.

6. An electric power converter according to claim 1, wherein the means for detecting the grounding configuration includes a current-limiting element and a current transformer connected in series between ground and the AC input connected to the neutral phase wire of the DC unit, thereby detecting the grounding configuration on the basis of the output current of the current transformer.

7. An electric power converter according to claim 1, wherein the means for detecting the grounding configuration includes a transformer connected in series between ground and the AC input connected to the neutral phase wire of the DC unit, thereby detecting the grounding configuration on the basis of the output voltage of the transformer.

8. An electric power converter according to claim 1, wherein the means for detecting the grounding configuration includes a current-limiting element and a transformer connected in series between ground and the AC input connected to the neutral phase wire of the DC unit, thereby detecting the grounding configuration on the basis of the output voltage of the transformer.

9. An electric power converter according to claim 1, wherein the means for detecting the grounding configuration includes a current-limiting element connected in series between ground and the AC input connected to the neutral phase wire of the DC unit, thereby detecting the grounding configuration on the basis of the voltage of the current-limiting element.

10. An electric power converter according to claim 1, wherein an alarm is produced or the apparatus is halted, except in the case where the AC input power source is not grounded and the AC input phase connected to the neutral phase wire of the DC unit is grounded.

11. An electric power converter according to claim 1, wherein the current-limiting element is one of a resistor, a capacitor, a reactor, a transformer, or a combination thereof.

* * * * *